United States Patent [19]

Laing

[11] Patent Number: 4,822,256

[45] Date of Patent: Apr. 18, 1989

[54] BEARING SUPPORT FOR SPHERICAL PUMPS

[76] Inventor: Karsten Laing, 1253 La Jolla Rancho Rd., La Jolla, Calif. 92037

[21] Appl. No.: 871,829

[22] Filed: Jun. 9, 1986

[30] Foreign Application Priority Data

Jun. 8, 1985 [DE] Fed. Rep. of Germany ....... 3520596

[51] Int. Cl.$^4$ .................... F04D 13/02; H02K 49/10; F16C 17/10
[52] U.S. Cl. .................................. 417/420; 310/104; 310/157; 310/166; 384/245; 384/438; 417/423.12
[58] Field of Search ............. 417/420, 423 P; 310/90, 310/157, 166, 104, 62, 63, 86, 91; 415/110, 111, 170 R; 384/226, 227, 240, 243–246, 223, 225, 302, 303, 420, 428, 438, 610, 903

[56] References Cited

U.S. PATENT DOCUMENTS

| | | | |
|---|---|---|---|
| 3,354,833 | 11/1967 | Laing | 417/420 X |
| 3,558,948 | 1/1971 | Laing | 310/157 |
| 3,803,432 | 4/1974 | Laing | 310/90 |
| 4,051,401 | 9/1977 | Hayward | 310/166 X |
| 4,072,446 | 2/1978 | Walker | 417/420 |

Primary Examiner—David Werner

[57] ABSTRACT

In a spherical pump, having a separation wall separating the wet part from the dry part of the pump, the column for the ball of the spherical bearing is made from the same material as the separation wall and is clamped in a cylindrical protrusion of the separation wall.

1 Claim, 1 Drawing Sheet

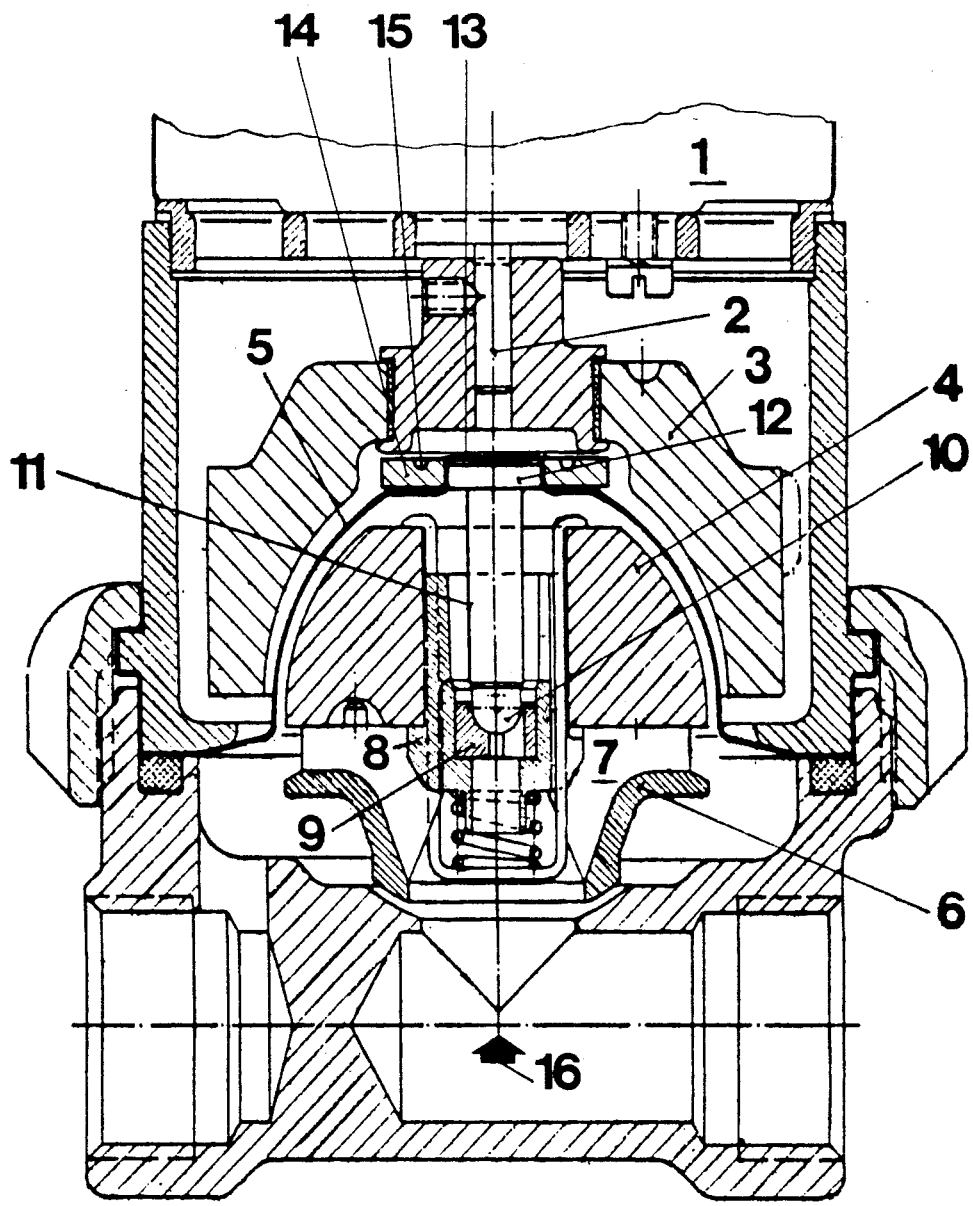

BEARING SUPPORT FOR SPHERICAL PUMPS

BACKGROUND OF THE INVENTION

The invention is concerned with magnetically driven centrifugal pumps whose rotor forms a unit with an impeller which is located in a rotary magnetic field. Pumps with magnetically driven rotors which have an airgap along a spherical surface show significant advantages relative to other centrifugal pumps, because the most unreliable elements of conventional centrifugal pumps, namely shafts, bushings and rotary seals, are eliminated. The driven rotor, which forms a rotating unit with the impeller, is not only magnetically coupled with the driving system, but at the same time is axially supported by a spherical bearing that cannot seize. The stationary part of the spherical bearing is mounted on a column that is fixed to the separation wall that separates the wet compartment from the dry compartment of the pump. This separation wall must be made from nonmagnetic material with very low electric conductivity, high tensile strength, and extremely high chemical resistance. It is current practice to weld or braze the column to the separation wall. The difficulty arises because the welding seam or brazing metal never will have exactly the same electro-chemical potential as the untreated separation wall material. Welding and brazing, therefore, will cause local electrolytic corrosion that might lead to penetration of the separation wall.

SUMMARY OF THE INVENTION

The invention refers to a design that overcomes this difficulty. According to the invention, a column which consists of a material with the same electro-chemical potential as the separation wall is used. This column has a base which is pressed into a cylindrical indentation at the nadir of the separation wall. The indentation forms a cylindrical protrusion on the opposite, convex side, that is clamped by a ring that squeezes the base of the column so firmly that the column is secure against any possible disturbing forces.

BRIEF DESCRIPTION OF THE DRAWINGS

The invention is described with the aid of the accompanying drawing.

DETAILED DESCRIPTION OF A PREFERRED EMBODIMENT

The FIGURE shows a cross section of a magnetically driven centrifugal pump with a rotor-impeller unit (4,6,7,8). The concave-shaped annular magnet (3) is driven by motor (1). This concave magnet (3) forms together with the convex annular magnet (4) a magnetic coupling. The dry compartment, containing the motor (1) and the concave magnet (3), is separated from the wet compartment by the spherical separation wall (5). The annular magnet (4) forms a rotating unit with the impeller that is composed of the shroud (6), the vanes (7), and the hub portion (8). This impeller-rotor unit (4,6,7,8) is pressed against the ball (10), made from hard ceramic and fitting in the bearing cup (9), and is attracted in the direction of arrow (16). The ball (10) is mounted on the column (11). The base (12) of column (11) fits in the cylindrical indentation (13) at the nadir of the separation wall (5). This indentation (13) forms a cylindrical protrusion on the convex side of said separation wall (5). The cylindrical protrusion is surrounded by a ring (14). The embossment of the annular groove (15) causes extremely high forces directed against the axis (2) so that the column (11) is fixed in the separation wall (15) by friction forces.

I claim:

1. Spherical bearing consisting of a rotating bearing cap (9) and a stationary spherical bearing member (10), said spherical bearing member being mounted on a strut (11) for a pump which forms a unit with an electric motor, the pump having an impeller (6,7) which forms a unit with a driven annular rotor (4) with a spherical surfaces, said rotor (4) being separated from a driving portion of the motor by a thin-walled, spherical, magnetically permeable separation wall (5) consisting of a corrosion resistant metal, characterized in that the strut (11) of the spherical bearing member (10) consists of a metal having the same eletro-chemical potential as the separation wall (5) and that the strut (11) has a foot portion (12), said foot portion being situated inside of a protrusion (13) at the nadir of the separation wall (5) the protrusion having a cylindrical wall portion which is surrounded by a metal ring (14) said metal ring being elastically expanded producing centripetally oriented forces on said cylindrical wall portion of the protrusion (13) so that the foot portion (12) is clamped by friction forces.

* * * * *